United States Patent [19]

Gollinger

[11] 4,371,794

[45] Feb. 1, 1983

[54] MONOLITHIC INTEGRATED CIRCUIT

[75] Inventor: Wolfgang Gollinger, Gundelfingen, Fed. Rep. of Germany

[73] Assignee: ITT Industries, Inc., New York, N.Y.

[21] Appl. No.: 193,070

[22] Filed: Oct. 2, 1980

[51] Int. Cl.³ ........................ H03K 5/13; H03K 3/335
[52] U.S. Cl. ................................. 307/269; 307/279; 307/303
[58] Field of Search ............... 307/279, 269, 303, 480, 307/477; 328/55

[56] References Cited

U.S. PATENT DOCUMENTS

| | | | |
|---|---|---|---|
| 3,745,380 | 7/1973 | Kitajima et al. | 307/269 |
| 4,143,326 | 3/1979 | Heitmann | 328/55 |
| 4,198,575 | 4/1980 | Lesche | 307/269 |
| 4,229,699 | 10/1980 | Frissell | 307/269 |

*Primary Examiner*—Stanley D. Miller
*Assistant Examiner*—B. P. Davis
*Attorney, Agent, or Firm*—John T. O'Halloran; Peter C. Van Der Sluys

[57] ABSTRACT

For the multiple utilization of an external IC terminal, e.g. as input for some options e.g. a testing sequence, there is provided in the IC a special clock generator for three clock signals which are combined in such a way via switches and an inverter that different potentials at the external terminal are "recognized" and converted into different binary signals.

5 Claims, 7 Drawing Figures

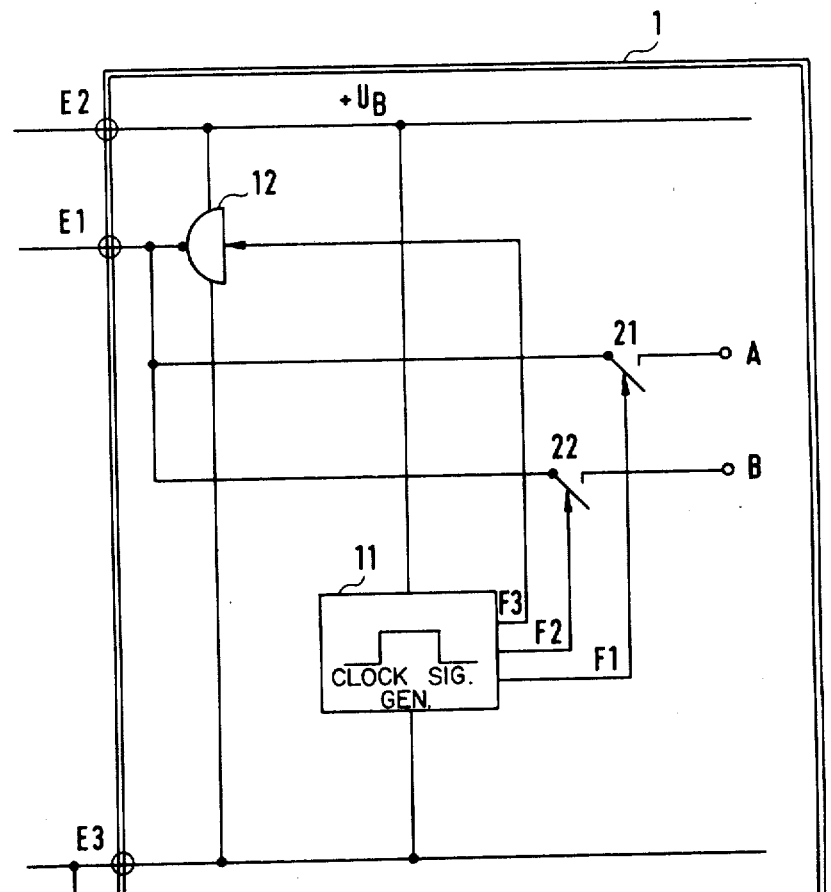
Fig.1
Fig. 2
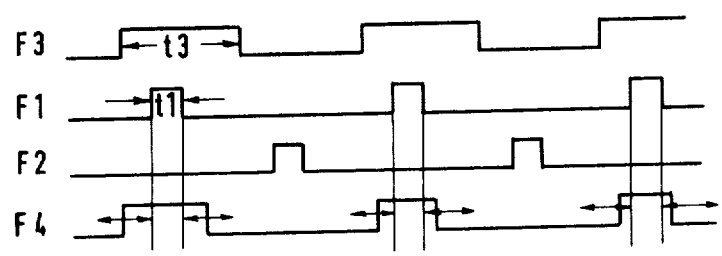

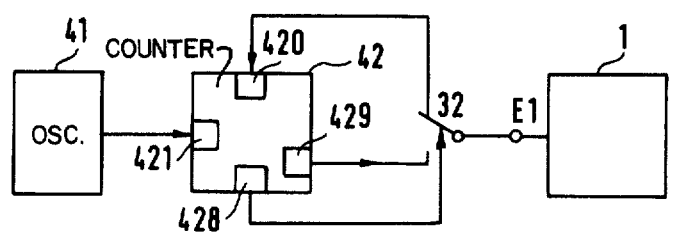
Fig. 6
Fig. 7
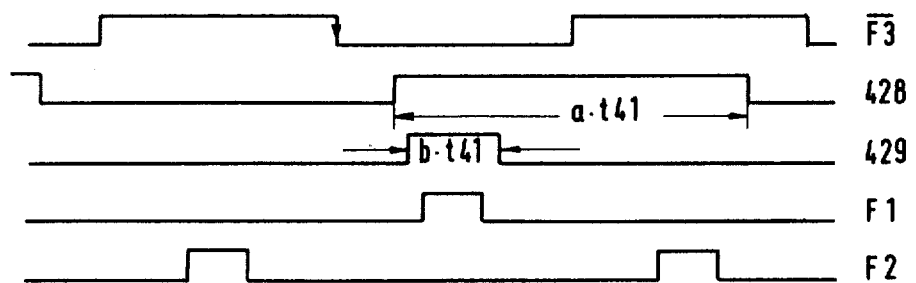

4,371,794

MONOLITHIC INTEGRATED CIRCUIT

SUMMARY OF THE INVENTION

The invention relates to a monolithic integrated circuit which, apart from other circuit portions, also includes a clock signal generator, and which has at least one outer (external) terminal which, during operation, is applied to one of several potentials selectable by way of outer connections.

With the aid of such an outer terminal, for example, so-called options of the integrated circuit intended for a certain purpose, can be enabled, i.e. in dependence upon the potentials applied to the outer terminal, several function varieties of the integrated circuit are selectable. Via this outer terminal, however, also test signals can be fed into the integrated circuit by which, for example, there is achieved a quicker testing of the internal function sequences than when the test was to be performed with the aid of the clock signal generator inherent in the integrated circuit. This requirement exists, for example, in the case of integrated circuits designed for use with electronic clocks, and which not only divide the frequency of a crystal oscillator down into the order of 1 Hz, but also produce the alarm signal programs with times substantially longer than 1 s. Testing such integrated circuits would then last for the maximum intended alarm time, in order to be able to test all the functions. By changing the internal function sequence via the aforementioned option connection, it is possible with these types of integrated circuits to reduce the test time, i.e. the time required for the test substantially.

It will be easily understood that the multiple utilization of an individual terminal by applying several selectable potentials requires a circuit portion within the integrated circuit, which is capable of recognizing these different potentials so to speak, and which, in general, converts them into the two states H, L of a binary signal.

It is the object of the invention as characterized in the claims, to design a monolithic integrated circuit comprising a clock signal generator with at least one outer terminal, to which may be applied one of several potentials selectable by way of outside connections.

DESCRIPTION OF THE DRAWINGS

FIG. 1 shows a basic circuit diagram relating to one example of embodiment of the integrated circuit according to the invention.

FIG. 2 shows various signal wave-forms as occurring during the operation of the arrangement according to FIG. 1.

FIG. 6 shows a third circuit including an integrated circuit according to the invention as well as a square-wave signal generator.

FIG. 7 shows various types of signal waveforms as occurring in the arrangement according to FIG. 6.

DESCRIPTION OF THE INVENTION

Figure 3:
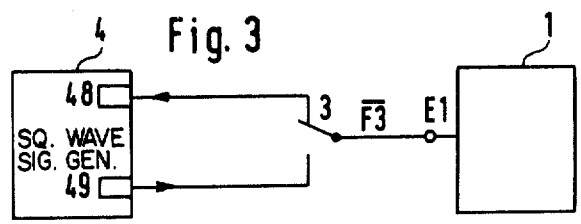
FIG. 3 shows a first circuit including an integrated circuit according to the invention, as well as a square-wave signal generator.

In FIG. 1, the reference numeral 1 indicates the integrated circuit whose casing is denoted by the double-lined rectangle. On this casing there are shown three of a great number of possible outer terminals, viz. the first outer terminal E1 to which, during operation, and in accordance with the invention, four selectable potentials can be applied, then the outer terminal E2 for the supply voltage $U_B$, and the outer terminal E3 for connection to the zero point of the circuit.

Within the integrated circuit there is provided a clock signal generator 11 which, amongst others, produces the three equi-frequency clock signals F1, F2, F3. Of these, the first clock signal F1 and the second clock signal F2 have a pulse-to-interval ratio smaller than unity, and are phase-shifted with respect to one another by 180°, cf. FIG. 2. The pulse width t3 of the third clock signal F3 is greater than that of t1, i.e. that of the first clock signal F1, and overlaps it, cf. FIG. 2.

To the outer terminal E1 to which the four potentials are capable of being applied, there is connected the output of the inverter 12 to the input of which there is fed the third clock signal F3. Moreover, the outer terminal E1, via the first electronic make contact 21, is applied to the circuit point A of the integrated circuit and, via the second electronic make contact 22, to the circuit point B. The control input of the first electronic make contact 21 is applied to the output of the clock signal generator 11 for the first clock signal F1, and the control input of the second electronic make contact is connected to the output thereof, i.e. for the second clock signal F2.

Figure 4:
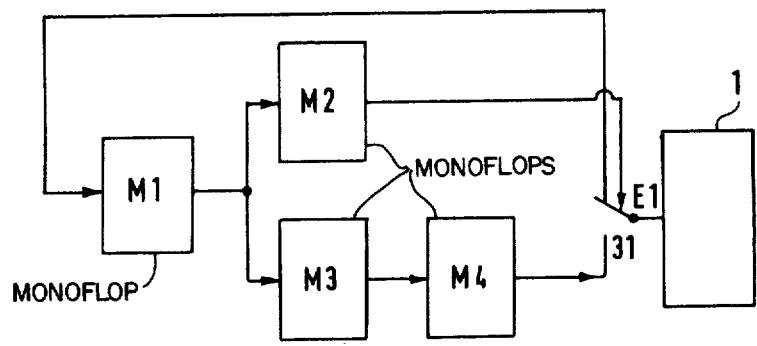
FIG. 4 shows a second circuit including an integrated circuit according to the invention as well as a square-wave signal generator.

The four potentials which are capable of being applied to the outer terminal E1, are the potential of the supply voltage $U_B$, the potential of the zero point of the circuit, the potential of the outer terminal E1 itself, hence without any outer connection, and the potential of the output of the square-wave signal generator 4, cf. FIGS. 3, 4 and 6.

The output resistance of the inverter 12, in the two switching states thereof, is to be chosen to be high with respect to the internal resistance of the square-wave signal generator 4.

With respect to the following explanation of the mode of operation, it is first assumed that the frequency of the clock signal generator 11 is in the order of 10 kHz. If now the outer terminal E1 is connected to the terminal E2, hence applied to the potential of the supply voltage $U_B$, then both circuit points A, B practically assume the potential of the supply voltage. Analagously the same applies when the outer terminal E1 is connected to the terminal E3, hence to the zero point of the circuit, with the two circuit points A, B both practically conducting the potential of the zero point of the circuit. In the third one of the possible cases, hence in the case of an "open" outer terminal 1, the circuit point A practically conducts the potential of the zero point of the circuit, and the circuit point B practically conducts the potential of the supply voltage $U_B$. Accordingly, it is thus in a simple way possible to assign to these states a binary valency which, in the case of a positive logic, results in the first case to AB=HH, and in the second case to AB=LL, and in the third case to AB=LH.

If, however, to the outer terminal E1, there is applied the already mentioned square-wave signal generator 4 according to FIGS. 3, 4 or 6, then, with respect to the potentials at the circuit points A, B, there will result the circuit state AB=HL. Thus, in accordance with the embodiment of the invention, four binary value combinations are assigned to the four potentials which may then be further evaluated with the aid of further stages provided for within the integrated circuit, but which are of no particular interest in this connection. The way in which this evaluation is to be carried out, is to be left to the person skilled in the art.

The potentials at the circuit points A, B, at the already mentioned frequency of the clock signal generator 11 which is in the order of 10 kHz, and when realizing the integrated circuit 1 in accordance with the well known MOS-technique, are practically stationary potentials, because the further circuit stages are applied to the circuit points A, B so that, accordingly, a temporary potential storage will appear at the input capacitance thereof.

When realizing the integrated circuit 1 in accordance with any other technique, such as the bipolar technique, in particular the I²L technique, or in the case of lower frequencies of the clock signal generator 11, i.e. lower than approximately 10 kHz, it might become necessary to insert between the circuit points A, B and the outputs of the electronic make contacts 21, 22, a hold circuit, such as in the form of flip-flops, etc.

The circuit diagram of FIG. 3 shows how the square-wave signal generator 4 is to be interconnected with the integrated circuit 1 via the outer terminal E1 thereof. Relative thereto, the square-wave signal generator 4 is assumed to be one of the type capable of being synchronized via the sync input 48, which is synchronized by the inverted third clock signal $\overline{F3}$ as applied to the outer terminal E1 of the integrated circuit 1, when the switch 3 is in the position as shown in FIG. 3. This simple arrangement can be used, for example, for the aforementioned test purpose. The testing person first switches the switch 3 to the sync input 48 and, thereafter, to the output 49 thereof so that now the square-wave signals, which are phase shifted by 180° with respect to the inverting third clock signal $\overline{F3}$, are fed into the integrated circuit 1 via the terminal E1, with the frequency of these square-wave signals being equal to that of the third clock signal F3, and with the frequency stability thereof, during the feeding into the integrated circuit 1, having to be in agreement with that of the clock signal generator 11.

The block diagram of FIG. 4 shows an arrangement including the square-wave signal generator, in which the changeover switch 3 according to FIG. 3, has been replaced by the electronic switch 31, so that now the square-wave signal is fed automatically into the integrated circuit 1 via the outer terminal E1, without any action being required on the part of a testing person.

This purpose is served by the four monostable multivibrators M1, M2, M3, M4 which, hereinafter, and for the sake of simplicity, are referred to as monoflops. The input of the monoflop M1 is applied to the first input of the electronic switch 31. The output of the monoflop M1 is connected to the respective input of the monoflops M2, M3. The output of the monoflop M2, in turn, is connected to the control input of the electronic switch 31, and that of the monoflop M3 is connected to the input of the monoflop M4 whose output is applied to the second input of the electronic switch 31, with the output thereof being connected to the outer terminal E1 of the integrated circuit 1.

Figure 5:
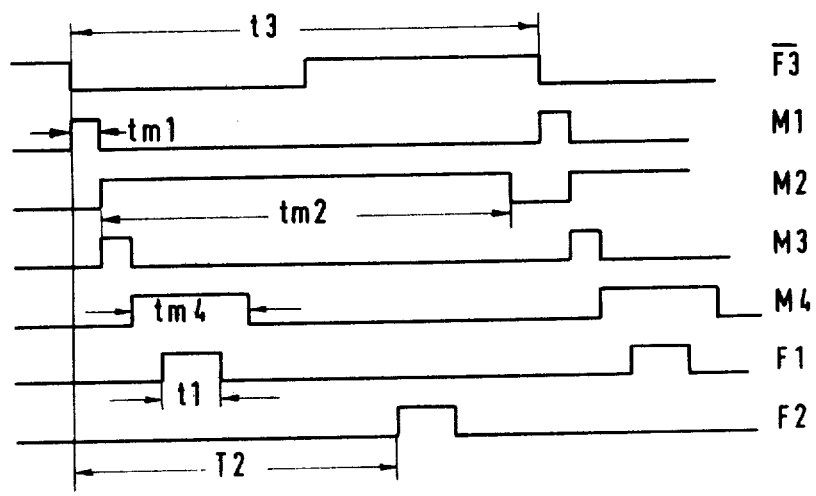
FIG. 5 shows various types of signal waveforms as occurring in the arrangement according to FIG. 4.

Relative thereto, and for the time durations tm1, tm2, tm3, tm4 of the metastable state of the respective monoflop M1 . . . M4 the following relationships apply:

$$tm1 \approx tm3 \approx 0.1\ t3$$

$$tm2 < t3 - tm1$$

$$tm4 < T2 - tm1 - tm3$$

see also FIG. 5, where T2 is the time between one trailing edge of the inverted clock signal $\overline{F3}$ and the leading edge of the second clock signal F2.

Accordingly, the monoflops M2, M3 are triggered upon the lapse of tm1, and after the lapse of tm3 also the monoflop M4 is triggered. During the time tm2 the output of the monoflop M4, via the switch 31, is applied to the outer terminal E1 of the integrated circuit 1, with the time duration tm4 overlapping the time duration t1 of the first clock signal F1. Before the end of the time duration t3 of the inverted third clock signal $\overline{F3}$, the time duration tm2 has already ended, so that now the switch 31 switches over to the outer terminal E1, thus permitting the described cycle to be restarted upon the next negative edge of the inverted third clock signal $\overline{F3}$.

FIG. 6 shows another circuit arrangement including the square-wave signal generator. This consists of the free-running oscillator 41 and of the counter 42, to the counter input 421 of which the oscillator pulses are fed. The reset input 420 of the counter 42 is applied to the first input of an electronic switch 32 whose output is connected to the outer terminal E1, with the counter starting to count upon occurrence of the trailing edge of the inverted third clock signal $\overline{F3}$.

The output 428 associated with the first count range a is applied to the control input of the electronic switch 32, and the output 429 associated with the second count range b lying within the first count range a, is applied to the second input of the electronic switch 32. The count ranges a, b, with respect to the duration of the period of time t41 of the free-running oscillator 41, are chosen thus that the upper limit of the count range a is reached prior to the next trailing edge of the inverted third clock signal $\overline{F3}$, and the upper end of the count range b is ahead of the point at which the leading edge of the second clock signal F2 is reached. Accordingly, at the beginning of the count range a, the electronic switch 32 is switched to the output 429, and during the count range b, the potential of the supply voltage is applied to the outer terminal E1. In cases where the integrated circuit 1 is a quartz crystal clock circuit producing an alarm signal, as already referred to hereinbefore, it is possible, for example, by way of connecting the three potentials, i.e. supply voltage, zero point of the circuit, own potential, to the terminal E1, that the integrated circuit can be operated without utilizing the alarm signal, or else with one of two possible alarm signal sequences. Via the fourth potential, hence the output signal of the square-wave signal generator according to FIGS. 3, 4 and 6, another option is possible, with which the already mentioned testing of the integrated circuit in the course of a quicker test cycle becomes possible.

Although the invention has been described with reference to its use in a quartz-crystal clock circuit, it is, of course, in no way restricted to such a use. In fact, the invention can be used with any kind of integrated circuit to which a similar formulation of a problem refers.

As is well known, in the case of the aforementioned clock circuit, the current consumption is required to be as small as possible. In this case, the integrated circuit will generally be realized in accordance with the known CMOS technique. Then the inverter 12, of course, is a CMOS inverter, and both the first and the second electronic make contacts 21, 22 are realized with the aid of CMOS-transmission gates. As regards the controlling clock signals F1, F2, there is then respectively required a clock inverter for controlling the two gates of the respective transmission gate.

The practical application of the invention, in the case of the aforementioned clock circuits, is also not only restricted to the selection of two different alarm signals by correspondingly connecting the outer terminal E1. Thus, if so required, also two signal output wave-forms differing from one another can be made selectable, which are provided for different indicating (display) units or stepping motors.

What is claimed is:

1. A circuit, comprising:
a clock signal generator with at least one outer terminal, to which may be applied one of several potentials selectable by way of outside connections, the outer terminal (E1) is applied optionally to one of four potentials of which the first one is that of the supply voltage source $U_B$, of which the second one is that of the zero point of the circuit, of which the third one is that of the outer terminal (E1) itself without any outside connections, and of which the fourth one is that of the output of a square-wave signal generator (4), the clock signal generator (11) produces at least three square-wave clock signals (F1, F2, F3) of equal frequency of which the first and second ones each have a pulse-interval ratio smaller than unity and which are phase-shifted with respect to one another by 180°, while the pulse duration (t3) of the third one is longer than that of the first one and overlaps it, the outer terminal (E1) is applied to the output of an inverter (12) to the input of which there is fed the third clock signal (F3) and, moreover, via a first electronic make contact (21) to the control input of which there is fed the first clock signal (F1) to a first circuit point (A) and, via a second electronic make contact (22) to the control input of which there is fed the second clock signal (F2) to a second circuit point (B), and the output resistance of the inverter (12), in the two switching states thereof is high with respect to the internal resistance of the square-wave signal generator (4).

2. An circuit as claimed in claim 1, wherein said inverter (12) is a CMOS-inverter and that both the first and the second electronic make contacts (21, 22) are each CMOS-transmission gates.

3. A circuit, as claimed in claims 1 or 2, wherein said square-wave signal generator (4) is one capable of being synchronized via a synchronizer input (48), applied via the first input of a changeover switch (3) to the outer terminal (E1), while to the second input of said changeover switch (3) there is applied the output of the square-wave signal generator, having the same frequency as said third clock signal (F3).

4. A circuit as claimed in claims 1 or 2, wherein the square-wave signal generator consists of four monoflops (M1, M2, M3, M4), the input of the first monoflop (M1) is applied via the first input of an electronic changeover switch (31) to the outer terminal (E1), the output of the first monoflop is connected to the respective input of the second and the third monoflop (M2, M3), the output of the second monoflop is applied to the control input of the electronic changeover switch (31) and the output of the third monoflop is applied to the input of the fourth monoflop (M4) whose output is applied to the second input of the electronic changeover switch (31), and for the time duration (tm1, tm2, tm3, tm4) of the metastable state of the respective monoflop (M1 . . . M4) the following relationships apply:

$$tm1 \approx tm3 \approx 0.1 \, t3$$

$$tm2 < t3 - tm1$$

$$tm4 < T2 - tm3 - tm1,$$

where t3 is the pulse width of said third clock signal (F3) and T2 is the time between the trailing edge of the inverted third ($\overline{F3}$) and the leading edge of said second clock signal (F2).

5. A circuit as claimed in claims 1 or 2, wherein the square-wave signal generator consists of a free-running oscillator (41) and of a counter (42) whose counter input (421) is connected to the output of said free-running oscillator (41), the reset input (420) of the counter (42) is applied to the first input of an electronic changeover switch (32) whose output is applied to the outer terminal (E1), the counter (42) starts to count with the trailing edge of the inverted third clock signal ($\overline{F3}$), the output (428) of a first count range (a) is connected to the control input of the electronic changeover switch (32) and the output (429) of a second count range (b) lying within said first count range (a), is connected to the second input of said electronic changeover switch (32).

* * * * *